US009743479B2

(12) United States Patent
Jung

(10) Patent No.: US 9,743,479 B2
(45) Date of Patent: *Aug. 22, 2017

(54) LED LIGHTING APPARATUS WITH IMPROVED FLICKER INDEX

(71) Applicant: Seoul Semiconductor Co., Ltd., Ansan-si (KR)

(72) Inventor: Hye-man Jung, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,329

(22) Filed: Dec. 12, 2016

(65) Prior Publication Data

US 2017/0094740 A1 Mar. 30, 2017

Related U.S. Application Data

(63) Continuation of application No. 14/557,250, filed on Dec. 1, 2014, now Pat. No. 9,538,599.

(30) Foreign Application Priority Data

Nov. 5, 2014 (KR) ........................ 10-2014-0152694

(51) Int. Cl.
H05B 39/00 (2006.01)
H05B 33/08 (2006.01)

(52) U.S. Cl.
CPC ..... H05B 33/0851 (2013.01); H05B 33/0812 (2013.01)

(58) Field of Classification Search
CPC ............ H05B 33/0803; H05B 33/0827; H05B 33/0809; H05B 33/0821; F21Y 2101/02;
(Continued)

(56) References Cited

U.S. PATENT DOCUMENTS 8,564,219 B2 10/2013 Lee et al.
8,698,407 B1 4/2014 Chen et al.
(Continued)

OTHER PUBLICATIONS

Non-Final Office Action issued Nov. 25, 2015, in U.S. Appl. No. 14/557,250.
(Continued)

*Primary Examiner* — Minh D A
(74) *Attorney, Agent, or Firm* — H.C. Park & Associates, PLC

(57) ABSTRACT

A sequential driving type alternating current (AC) LED lighting apparatus including a rectifier connected to an alternating current (AC) power source and outputting a first rectified voltage as a first drive voltage to a light-emitting diode (LED) light-emitting device through full-wave rectification of an AC voltage, and an LED drive controller configured to detect a first drive voltage applied to the LED light emitting device and control sequential driving based on the detected first drive voltage. The LED drive controller is configured to set an LED drive current in each of operation sections, such that a difference between light output of the LED light-emitting device in each of the operation sections does not exceed a predetermined light output deviation.

8 Claims, 6 Drawing Sheets

(58) Field of Classification Search
CPC ...... B60Q 11/005; B60Q 11/002; G08B 5/38; G08B 1/095; G08B 3/3406
USPC ......... 315/312, 812 R, 291, 308, 307, 209 R
See application file for complete search history.

(56) References Cited

U.S. PATENT DOCUMENTS

| | | |
|---|---|---|
| 9,538,599 B2 * | 1/2017 | Jung .................. H05B 33/0851 |
| 2011/0199003 A1 | 8/2011 | Muguruma et al. |
| 2012/0126710 A1 | 5/2012 | Lin et al. |
| 2012/0212143 A1 | 8/2012 | Esaki et al. |
| 2013/0200796 A1 | 8/2013 | Song et al. |
| 2013/0257298 A1 | 10/2013 | Cheon et al. |
| 2014/0232289 A1 | 8/2014 | Brandes et al. |

OTHER PUBLICATIONS

Final Office Action issued May 31, 2016, in U.S. Appl. No. 14/557,250.
Notice of Allowance issued Sep. 2, 2016, in U.S. Appl. No. 14/557,250.

\* cited by examiner

<RELATED ART>

<RELATED ART>

<RELATED ART>

LED LIGHTING APPARATUS WITH IMPROVED FLICKER INDEX

CROSS-REFERENCE TO RELATED APPLICATIONS

This application is a Continuation of U.S. application Ser. No. 14/557,250, filed on Dec. 1, 2014, and claims priority from and the benefit of Korean Patent Application No. 10-2014-0152694, filed on Nov. 5, 2014, which is hereby incorporated by reference for all purposes as if fully set forth herein.

BACKGROUND

Field

Exemplary embodiments of the present invention relate to a light emitting diode (LED) lighting apparatus with improved flicker index. More particularly, exemplary embodiments of the present invention relate to a sequential driving type alternating current (AC) LED lighting apparatus with improved flicker index, which can reduce light output deviation in is an operation section by controlling an LED drive current supplied to LEDs based on the number of LEDs in a preset LED group.

Discussion of the Background

LEDs are generally operated by direct current (DC) driving. DC driving requires an AC-DC power converter such as an SMPS and the like, and such a power converter may cause an increase in manufacturing costs of luminaires, difficulty in reducing the size of the luminaires, deterioration in energy efficiency of the luminaires, and reduction in lifespan of the lighting apparatus due to short lifespan of the power converter.

To resolve such problems of DC driving, AC driving of LEDs has been suggested. However, an AC driving circuit may cause a reduction in power factor due to mismatch between input voltage and output power from the LEDs, and also severe flickering perceived by a user in the case where a non-light emitting section of LEDs is extended.

FIG. 1 is a conceptual view illustrating a flicker index. A definition and regulation of the flicker index as a reference flicker level in accordance with the Energy Star specifications will be described hereinafter.

(1) Definition of Flicker

Flicker means a phenomenon where lighting brightness is changed for a certain period of time, and severe flicker can be perceived as shaking light by a user. Flicker may be generated due to a difference between a maximum light output and a minimum light output for a certain period of time.

(2) Types of Flicker Index (a) Flicker index: as shown in FIG. 1, the flicker index means a value obtained by dividing an area (Area1) above the level of average light output by the total light output area (Area1+Area2) on a light output waveform of one cycle. Thus, the flicker index is a value numerically indicating frequency of illumination above the level of average light output in one cycle and a lower flicker index indicates a better flicker level. "Improved flicker index" may mean a lower flicker index, that is, less flicker.

(b) Percent flicker or Modulation depth: percent flicker refers to a value numerically indicating a minimum intensity of light and a maximum intensity of light for a certain period of time. Such a percent flicker can be calculated according to the equation: 100*(maximum intensity of light−minimum intensity of light)/(maximum intensity of light+minimum intensity of light).

(3) Flicker Level in Accordance with Energy Star Specifications

Light output waveform≥120 Hz

Flicker index≤frequency×0.001 (at Max. Dimmer, excluding flicker index at 800 Hz or more) (Thus, flicker index at 120 Hz≤0.12)

As described above, the issue of flicker level is of increasing concern in performance of LED lighting apparatuses.

FIG. 2 is a schematic block diagram of a conventional four-stage sequential driving type LED lighting apparatus, and FIG. 3 is a waveform diagram depicting a relationship between drive voltage and LED drive current of the conventional four-stage sequential driving type LED lighting apparatus shown in FIG. 2. Next, referring to FIG. 2 and FIG. 3, problems of the conventional LED lighting apparatus will be described.

First, as shown in FIG. 2, a conventional LED lighting apparatus 100 may include a rectification unit 10, an LED light emitting unit 20, and an LED drive controller 30.

In the conventional LED lighting apparatus 100, the rectification unit 10 generates is rectified voltage Vrec through rectification of AC voltage supplied from an external power source, and outputs the rectified voltage Vrec to the LED light emitting unit 20 and the LED drive controller 30. A full-wave rectification circuit, a half-wave rectification circuit, and the like may be used as the rectification unit 10. In FIG. 2, a bridge full-wave rectification circuit composed of four diodes D1, D2, D3, and D4 is shown. In addition, the LED light emitting unit 20 is composed of four LED groups including first to fourth LED groups 21 to 24, which may be sequentially turned on or off under control of the LED drive controller 30. The conventional LED drive controller 30 is configured to control the first to fourth LED groups 21 to 24 to be sequentially turned on or off according to a voltage level of the rectified voltage Vrec.

The conventional LED drive controller 30 increases or decreases the LED drive current according to a voltage level of input voltage (that is, rectified voltage (Vrec)) to perform constant current control in each of sequential driving sections. As a result, the LED drive current has a stepped waveform approaching a sine wave, whereby power factor (PF) and total harmonic distortion (THD) of the LED lighting apparatus are enhanced, thereby improving power quality of the LED lighting apparatus.

Operation of the conventional LED lighting apparatus 100 will be described in more detail with reference to FIG. 3. Referring to FIG. 3, in an operation section in which the rectified voltage Vrec is greater than or equal to a first forward voltage level Vf1 and less than a second forward voltage level Vf2 (a first stage operation section), the conventional LED drive controller 30 performs constant current control such that only the first LED group 21 is turned on and an LED drive current $I_{LED}$ becomes a first LED drive current $I_{LED1}$. Similarly, in an operation section in which the rectified voltage Vrec is greater than or equal to the second forward voltage level Vf2 and less than a third forward voltage level Vf3 (a second stage operation section), the is conventional LED drive controller 30 performs constant current control such that only the first LED group 21 and the second LED group 22 are turned on and the LED drive current $I_{LED}$ becomes a second LED drive current $I_{LED2}$. Further, in an operation section in which the rectified voltage Vrec is greater than or equal to the third forward voltage level Vf3 and less than a fourth forward voltage level Vf4 (a third stage operation section), the conventional LED drive controller 30 performs constant current control such that the first to third LED groups 21 to 23 are turned on and the LED drive current $I_{LED}$ becomes a third LED drive current $I_{LED3}$. Last, in an operation section in which the rectified voltage Vrec is greater than or equal to the fourth forward voltage level Vf4 (a fourth stage operation section), the conventional LED drive controller 30 performs constant current control such that all of the first to fourth LED groups 21 to 24 are turned on and the LED drive current $I_{LED}$ becomes a fourth LED drive current $I_{LED4}$.

As shown in FIG. 3, the LED lighting apparatus is controlled such that the LED drive current in the first stage operation section (that is, the first LED drive current $I_{LED1}$) is larger than the LED drive current in the second stage operation section (that is, the second LED drive current $I_{LED2}$). Likewise, the LED lighting apparatus is controlled such that the third LED drive current $I_{LED3}$ is larger than the second LED drive current $I_{LED2}$ and the fourth LED drive current $I_{LED4}$ becomes the largest drive current. Accordingly, the entire light output of the conventional LED lighting apparatus 100 has a stepped waveform, as shown in FIG. 3. Accordingly, since the total number and drive current of LEDs operated to emit light differ according to the operation sections, the conventional LED lighting apparatus 100 provides different light output according to the operation sections, and thereby may cause a difference in light output according to the operation sections, and severe flicker, as described above.

Further, the conventional LED lighting apparatus 100 is configured to control is sequential driving based on drive voltage supplied to the LED light emitting unit 20, that is, based on the voltage level of the rectified voltage Vrec. However, such a voltage detection type may not satisfactorily reflect current/voltage characteristics based on temperature of LEDs. That is, regardless of different forward voltages of the LED groups according to operation temperatures of LEDs, the voltage detection type may not satisfactorily reflect I/V characteristics depending upon the actual temperatures of the LEDs. As a result, the LED drive current (LED light output) may be instantaneously dropped or overshot at a time point that the operation section is changed, for example, at a time point of changing the operation section from the first stage operation section to the second stage operation section, thereby causing uneven light output of the LED lighting apparatus 100.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide an LED lighting apparatus with improved flicker index that can provide more natural-appearing light to a user through reduction in light output deviation by removing a non-light-emitting section.

Exemplary embodiments of the present invention also provide a sequential driving type AC LED lighting apparatus with improved flicker index, which can reduce light output deviation in an operation section by controlling LED drive current supplied to LEDs based on the number of LEDs in a preset LED group.

Exemplary embodiments of the present invention also provide an LED lighting apparatus with improved flicker that can provide constant light output by controlling sequential driving of LED groups based on a method of detecting LED drive current.

Additional features of the inventive concept will be set forth in the description which follows, and in part will be apparent from the description, or may be learned by practice of the inventive concept.

An exemplary embodiment of the present invention discloses an LED lighting apparatus including: a rectification unit connected to an AC power source and outputting a first rectified voltage as a first drive voltage to an LED light emitting unit through full-wave rectification of AC voltage; the LED light emitting unit comprising a first LED group to an nth LED group (n being a positive integer of 2 or more) and operated to emit light when receiving the first drive voltage from the rectification unit; and an LED drive controller detecting an LED drive current flowing through the LED light emitting unit or a constant current switch connected to the LED light emitting unit and controlling sequential driving of the first LED group to the nth LED group based on the detected LED drive current, wherein the LED drive controller sets an LED drive current in each of operation sections such that a difference between light outputs of the LED light emitting unit in each of the operation zones does not exceed a predetermined light output deviation, and controls the LED drive current to a constant drive current in a corresponding operation section according to the set LED drive current in each of the operation sections.

The LED drive controller may set the LED drive current (a first LED drive current to an nth LED drive current) in each of the operation sections based on a total number of LEDs operated to emit light in each of the operation zones, and may control the LED drive is current to a constant drive current in the corresponding operation section according to the set LED drive current in each of the operation zones, wherein the first LED drive current to the nth LED drive current are set to be sequentially decreased.

The LED drive controller may set the LED drive current (a first LED drive current to an nth LED drive current) in each of the operation zones to be inversely proportional to the total number of LEDs operated to emit light in each of the operation zones, and may control the LED drive current to a constant drive current in the corresponding operation section according to the set LED drive current in each of the operation zones.

The LED drive controller may set the LED drive current (a first LED drive current to an nth LED drive current) in each of the operation zones to be inversely proportional to the total number of LEDs operated to emit light in each of the operation zones, may linearly increase or decrease the LED drive current at a time point of starting a certain operation section from a previous LED drive current set in a previous operation section to a preset LED drive current set for the certain operation section, and may control the LED drive current to the increased or decreased LED drive current for the certain operation section during a remaining period of time of the certain operation section.

The LED light emitting unit may include a first LED group and a second LED group, and a difference between light output of the first LED group during a first operation section and light output of the first LED group and the second LED group during a second operation section may be less than or equal to a preset light output deviation.

The LED lighting apparatus may further include a power factor compensation unit charged with energy using the rectified voltage in a charge section and supplying a second drive voltage to the LED light emitting unit in a compensation section, wherein the LED light emitting is unit may emit light upon receiving the second drive voltage in the compensation section.

The LED light emitting unit may include a first LED group and a second LED group, and the second drive voltage may be greater than or equal to a forward voltage level of the first LED group.

The power factor compensation unit may include a valley-fill circuit and may compensate for half of a total forward voltage level of the first to nth LED groups.

According to an exemplary embodiment of the present invention, the LED lighting apparatus can provide more natural-appearing light to a user through reduction in light output deviation by removing a non-light-emitting section through reduction in light output deviation by removing a non-light-emitting section.

According to an exemplary embodiment of the present invention, the LED lighting apparatus is a sequential driving type AC LED lighting apparatus, and can reduce light output deviation in an operation section by controlling LED drive current supplied to LEDs based on the number of LEDs in a preset LED group.

According to an exemplary embodiment of the present invention, the LED lighting apparatus can provide constant light output with improved flicker index by controlling sequential driving of LED groups based on detection of LED drive current, as compared with a conventional LED lighting apparatus that controls sequential driving of the LED groups based on detection of LED drive voltage.

It is to be understood that both the foregoing general description and the following detailed description are exemplary and explanatory and are intended to provide further explanation of the inventive concept as claimed.

BRIEF DESCRIPTION OF THE DRAWINGS

The accompanying drawings, which are included to provide a further understanding of the inventive concept and are incorporated in and constitute a part of this specification, illustrate exemplary embodiments of the inventive concept, and together with the description serve to explain the principles of the inventive concept.

DETAILED DESCRIPTION OF THE ILLUSTRATED EMBODIMENTS

Figure 1:
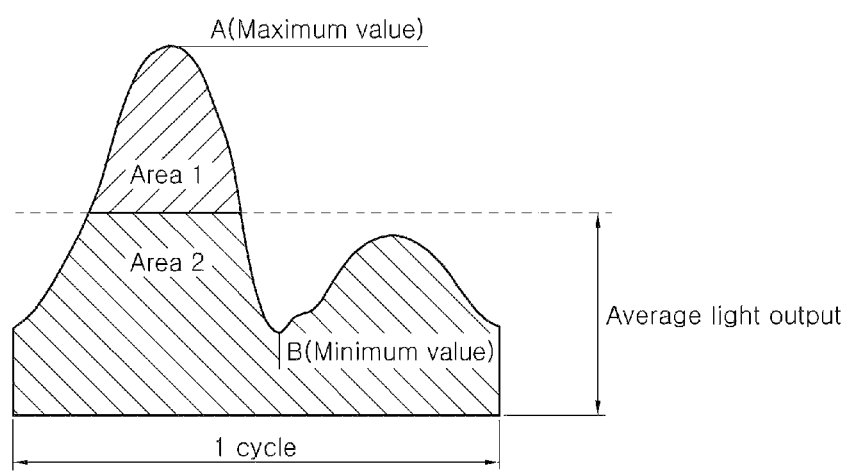
FIG. 1 is a conceptual view of flicker index according to the related art.

The present invention will be described more fully hereinafter with reference to the accompanying drawings, in which exemplary embodiments of the inventive concept are illustrated. These exemplary embodiments will be described such that the inventive concept can be easily realized by those skilled in the art. Here, although various exemplary embodiments are disclosed herein, it should be understood that these exemplary embodiments are not intended to be exclusive. For example, individual structures, elements or features of a particular exemplary embodiment are not limited to that particular exemplary embodiment and can be applied to other exemplary embodiments without departing from the spirit and scope of the inventive concept. In addition, it should be understood that locations or arrangement of individual components in each of the exemplary embodiments may be changed without departing from the spirit and scope of the inventive concept. Therefore, the following exemplary embodiments are not to be construed as limiting the inventive concept, and the inventive concept should be limited only by the claims and equivalents thereof. Like components having the same or similar functions will be denoted by like reference numerals.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the term "LED group" means a set of light-emitting diodes (LEDs) (or light-emitting cells), which are interconnected in series/parallel/series-parallel such that operation of the LEDs/light-emitting cells can be controlled as a single unit (that is, simultaneously turned on/turned off) by an LED drive module.

The term "first forward voltage level Vf1" means a critical voltage level capable of driving the first LED group, the term "second forward voltage level Vf2" means a critical voltage level capable of driving a first LED group and a second LED group connected to each other in series (that is, the sum of a forward voltage level of the first LED group and a forward voltage level of the second LED group), and the term "third forward voltage level Vf3" means a critical voltage level capable of driving the first to third LED groups connected to each other in series. The term "nth forward voltage level Vfn" means a critical voltage level capable of driving the first to nth LED groups connected to each other in series (that is, the sum of the forward voltage levels of the first to nth LED groups).

The term "drive voltage detection-based sequential driving type", "drive voltage detection-based multistage driving type", or derivatives of these terms, means sequentially turning on LED groups by an LED drive module, which drives LEDs upon receiving an input voltage varying over time, to emit light as the input voltage applied to the LED drive module increases, while sequentially turning off the LED groups as the input voltage decreases.

The term "drive current detection-based sequential driving type", "drive current detection-based multistage driving type", or derivatives of those terms, means sequentially turning on LED groups constituting an LED light emitting unit by the LED drive module, which drives LEDs upon receiving an input voltage varying over time, to emit light as LED drive current flowing through the LED light emitting unit or a constant current switch connected to the LED light emitting unit increases, while sequentially turning off the LED groups as the LED drive current decreases.

Regardless of drive voltage detection or drive current detection, in the sequential driving type or multistage driving type, the term "first stage operation section" means an operation section in which the first LED group emits light alone, and the term "second stage operation section" means an operation section in which only the first LED group and second LED group emit light. Likewise, the term "nth operation section" means an operation section in which all of the first to nth LED groups emit light.

The term "first drive voltage" means an input voltage itself or a drive voltage obtained from the input voltage processed through a certain device (for example, through a rectification circuit) and primarily supplied to the LED groups. The term "second drive voltage" means a drive voltage obtained from the input voltage stored in an energy storage device and secondarily supplied from the energy storage device to the LED groups. Such a second drive voltage may be a drive voltage obtained from the input voltage stored in a capacitor and then supplied from the charged capacitor to the LED groups. Accordingly, unless specifically referred to as the "first drive voltage" or the "second drive voltage", the term "drive voltage" generally includes the first drive voltage and/or the second drive voltage supplied to the LED groups.

The term "compensation section" means a section in which the level of the input voltage (rectified voltage) is less than a preset forward voltage level in sequential driving, and drive current is not supplied to an LED group. For example, a first forward voltage level Vf1 compensation section means a section in which the level of the rectified voltage is less than Vf1. In this case, the compensation section becomes a non-light-emitting section. Further, a second forward voltage level Vf2 compensation section means a section in which the level of the rectified voltage is less than Vf2. Thus, an nth forward voltage level Vfn compensation section means a section in which the level of the rectified voltage is less than Vfn. The term "first forward voltage level Vf1 compensation" means an operation of supplying the second drive voltage to the LED group to supply drive current to the LED group in the first forward voltage level Vf1 compensation section, and the term "second forward voltage level Vf2 compensation" means an operation of supplying the second drive voltage to the LED group in the second forward voltage level Vf2 compensation section. Thus, the term "nth forward voltage level Vfn compensation" means an operation of supplying the second drive voltage to the LED group in the nth forward voltage level Vfn compensation section.

The term "non-compensation section" or "normal operation section" means a section in which the level of the input voltage (rectified voltage) is greater than or equal to a preset forward voltage level in sequential driving, such that the input voltage (first drive voltage) is supplied to LED group(s) to operate the LED group(s) so that they emit light. When the first forward voltage level Vf1 compensation is carried out, the term "non-compensation section" (or "normal operation section") means a section in which the level of the input voltage is greater than or equal to Vf1, and in an exemplary embodiment in which the second forward voltage level Vf2 compensation is carried out, the term "non-compensation section" or "normal operation section" means a section in which the level of the input voltage is greater than or equal to Vf2. Accordingly, in an exemplary embodiment in which the nth forward voltage level Vfn compensation is carried out, the term "non-compensation section" or "normal operation section" means a section in which the level of the input voltage is greater than or equal to Vfn.

Terms V1, V2, V3, . . . , t1, t2, . . . , T1, T2, T3, and the like used to indicate certain voltages, certain time points, certain temperatures, and the like are relative values for differentiation from one another, rather than absolute values.

Overview of LED Lighting Apparatus 1000 with Improved Flicker Index

Figure 4:
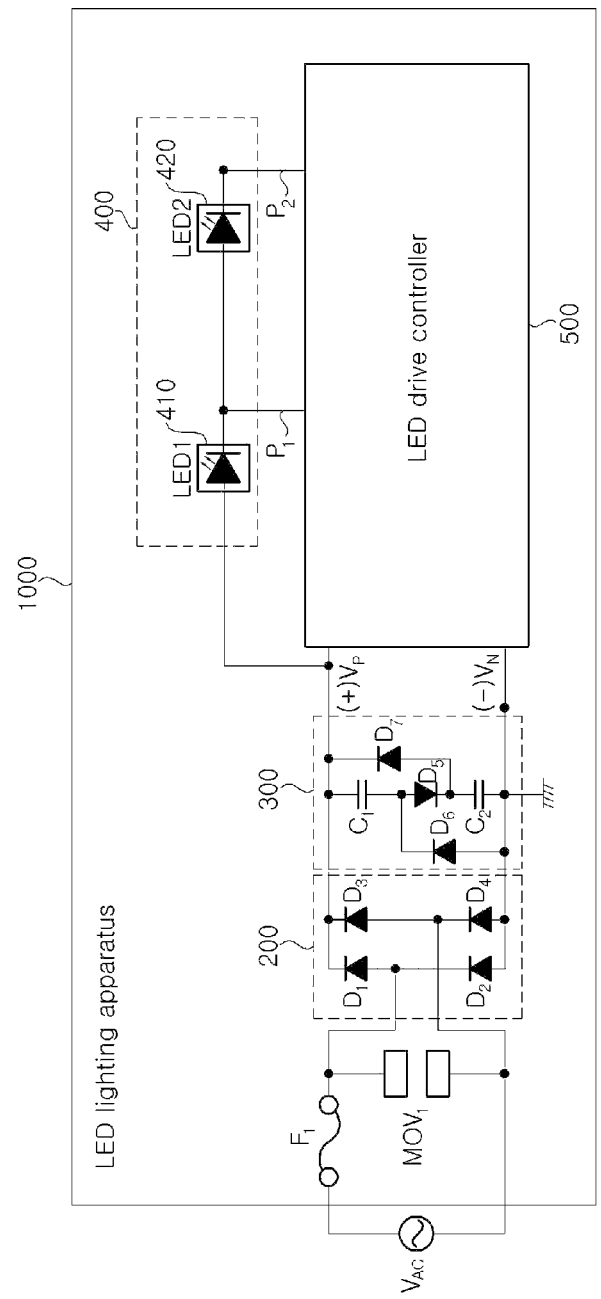
FIG. 4 is a schematic block diagram of an LED lighting apparatus according to an exemplary embodiment of the present invention.

FIG. 4 is a schematic block diagram of an LED lighting apparatus with improved (that is, lower) flicker index (hereinafter, "LED lighting apparatus") according to an exemplary embodiment of the present invention. Hereinafter, the configuration and functions of the LED lighting apparatus 1000 according to exemplary embodiments of the present invention will be described with reference to FIG. 4.

As described above, in a sequential driving type AC LED lighting apparatus, the number of LEDs operated to emit light increases with increasing voltage level of drive voltage supplied to an LED light-emitting unit 400, and the number of LEDs operated to emit light decreases with decreasing voltage level of the drive voltage supplied to the LED light-emitting unit 400. Thus, the lighting apparatus may be operated to control LED drive current in each of operation sections, to be inversely proportional to the number of LEDs operated to emit light in each of the operation sections. With such a method of controlling the LED drive current, when the number of LEDs operated to emit light is relatively small, the LED drive current is set to be is relatively large in the corresponding operation section, and when the number of LEDs operated to emit light is relatively large, the LED drive current is set to be relatively small in the corresponding operation section, thereby providing substantially uniform light output in each of the operation sections. The method of controlling the LED drive current will be described below with reference to FIG. 5 and FIG. 6.

Referring to FIG. 4, the LED lighting apparatus 1000 may include a rectification unit 200, a power factor compensation unit 300, an LED light emitting unit 400, and an LED drive controller 500.

First, the LED light emitting unit 400 may include LED groups, which are sequentially turned on to emit light or sequentially turned off by control of the LED drive controller 500. In FIG. 4, the LED light emitting unit 400 is illustrated as including a first LED group 410 and a second LED group 420. In the following, for convenience of description and understanding, the LED light emitting unit 400 will be illustrated as being composed of two LED groups. The LED light emitting unit 400 may alternatively be composed of four LED groups including a first LED group 410 to a fourth LED group (not shown).

The first LED group 410 and the second LED group 420 may have different forward voltage levels. For example, when each of the first and second LED groups 410, 420 includes a different number of LEDs or has a different series connection, parallel connection, or series/parallel connection relationship, the first and second LED groups 410, 420 will have different forward voltage levels from one another. In the present exemplary embodiment, the first LED group 410 has a forward voltage level that allows the first LED group 410 to be driven by a second drive voltage supplied from the power factor compensation unit 300 in a discharge section. The first LED group 410 is kept in a turned-on state in an overall cycle of AC voltage VAC. Hereinafter, for convenience of description and understanding, the first LED group 410 will be described as being kept in a turned-on state. Alternatively, the LED lighting apparatus may not include the power factor compensation unit 300 and thus the first LED group 410 may be turned on or turned off according to the voltage level of a rectified voltage Vrec.

In addition, the second LED group 420 may have the same forward voltage level as that of the first LED group 410, such that the sum of the forward voltage level of the first LED group 410 and the forward voltage level of the second LED group 420, that is, the second forward voltage level Vf2, becomes 70%-95% of a maximum voltage level. This design may improve drive efficiency of a constant current circuit.

Referring again to FIG. 4, the rectification unit 200 according to the present exemplary embodiment is configured to generate and output a rectified voltage Vrec by rectifying AC voltage VAC input from an external power source. A full-wave rectification circuit or a half-wave rectification circuit, may be used as the rectification unit 200. The rectification unit 200 is configured to supply the rectified voltage Vrec to the power factor compensation unit 300, the LED light emitting unit 400, and the LED drive controller 500. FIG. 4 shows a bridge full-wave rectification circuit composed of four diodes D1, D2, D3, and D4.

The power factor compensation unit 300 according to the present exemplary embodiment is configured to be charged with energy using the rectified voltage Vrec in a charge section and to supply a second drive voltage to the LED light emitting unit 400 in a compensation section. In FIG. 4, a valley-fill circuit composed of a first capacitor C1, a second capacitor C2 and three anti-reverse flow diodes D5, D6, and D7 is shown as the power factor compensation unit 300. Herein, since the configuration and functions of the valley-fill circuit is are known in the art, detailed descriptions thereof will be omitted.

The forward voltage level compensated by the power factor compensation unit 300 according to the present exemplary embodiment may be designed in various ways according to capacitance of charge/discharge devices (for example, the first capacitor C1, second capacitor C2, and the like of FIG. 4) constituting the power factor compensation unit 200. The power factor compensation unit 300 may be configured to compensate for a voltage level corresponding to ½ of the total forward voltage level (the sum of forward voltage levels of the LED groups), for example. Thus, when the forward voltage level of the first LED group 410 is less than or equal to the forward voltage level of the second LED group 420, the power factor compensation unit 300 may supply a voltage of the first forward voltage level Vf1 in the compensation section. Thus, the first LED group 410 is kept in a turned-on state irrespective of cycles of AC power.

Figure 2:
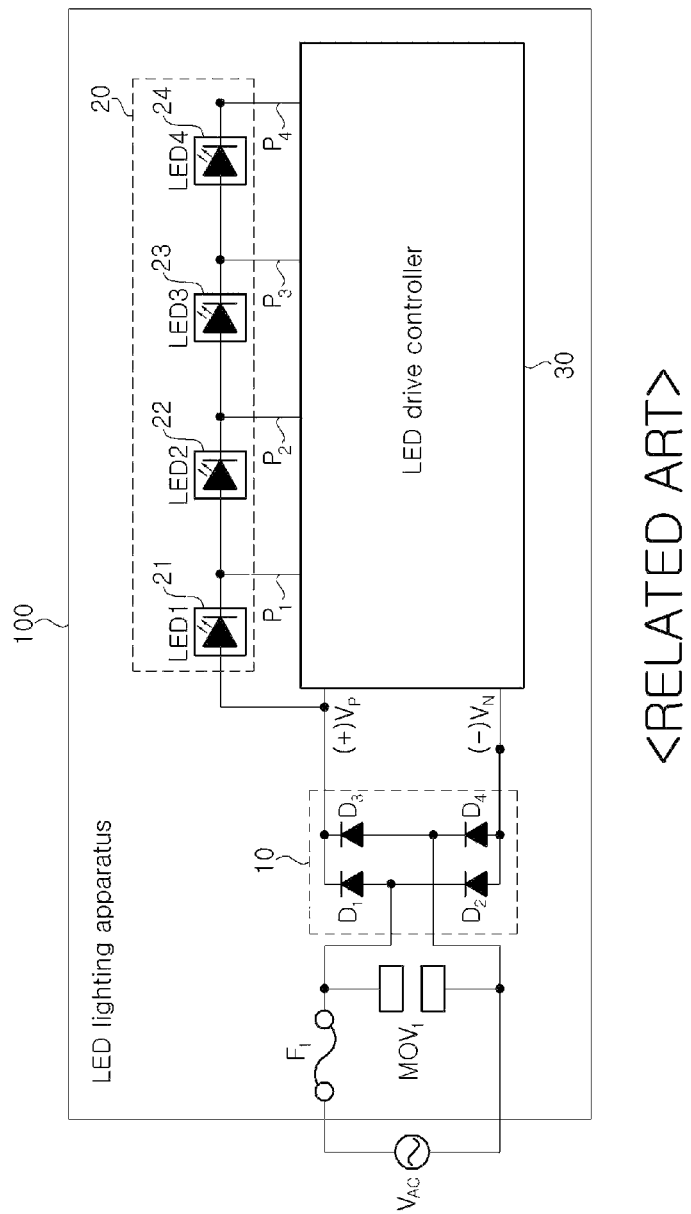
FIG. 2 is a schematic block diagram of a conventional four-stage sequential driving type LED lighting apparatus according to the related art.
Figure 3:
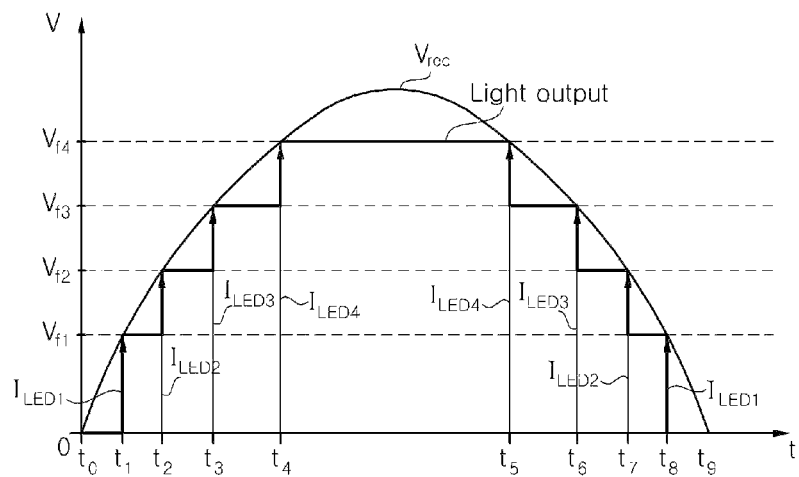
FIG. 3 is a waveform diagram depicting relationship between drive voltage and LED drive current of the conventional four-stage sequential driving type LED lighting apparatus shown in FIG. 2 according to the related art.

Comparatively, the conventional LED drive controller 500 shown in FIG. 2 is configured to control sequential driving of the LED groups based on drive voltage detection, whereas the LED drive controller 500 according to the present exemplary embodiment may be configured to detect the LED drive current ILED flowing through the LED light emitting unit 400 or constant current switch(es) (not shown) connected to the LED light emitting unit 400, and to control sequential driving of the first LED group 410 and the second LED group 420 based on the detected LED drive current ILED. Alternatively, the LED lighting apparatus according to an exemplary embodiment of the present invention may be configured to control sequential driving of the LED groups based on drive voltage detection.

In the LED lighting apparatus 1000 according to the present exemplary embodiment, when the voltage level of the drive voltage supplied to the LED light emitting unit 400 is greater than or equal to the forward voltage level of the first LED group 410, that is, the first forward voltage level Vf1, the LED drive current ILED flows through the first LED group 410, whereby the first LED group 410 can be turned on to emit light. The supplied drive voltage may be the voltage level of the first drive voltage (rectified voltage Vrec) supplied from the rectification unit 200 in the non-compensation section or the voltage level of the second drive voltage supplied from the power factor compensation unit 300 in the compensation section.

A first constant current switch (not shown) in the LED drive controller 500 connected to the first LED group 410 through a first current path P1 is in a turned-on state. Then, the LED drive current ILED flowing through the first LED group 410 is controlled to a preset first LED drive current ILED1 by the first constant current switch. In this state, when the drive voltage Vp supplied to the LED light emitting unit 400 continues to increase and then reaches a voltage level corresponding to the sum of the forward voltage level of the first LED group 410 and the forward voltage level of the second LED group 420, that is, the second forward voltage level Vf2 or more, the LED drive current ILED also flows through the second LED group 420, whereby the second LED group 420 is also turned on to emit light. At this time, a second constant current switch (not shown) in the LED drive controller 500 connected to the second LED group 420 through a second current path P2 is in a turned-on state, whereby the LED drive current ILED flowing through the second constant current switch can be detected. The LED drive controller 500 detects the LED drive current ILED flowing through the second constant current switch, and determines whether the LED drive current ILED flowing through the second constant current switch is maintained in a normal constant current state after a transient state (in which current increases and/or decreases).

When the LED drive current ILED flowing through the second constant current switch is maintained in the normal constant current, the LED drive controller 500 determines that the drive voltage Vp supplied to the LED light emitting unit 400 is sufficient to drive the first LED group 410 and the second LED group 420, and turns off the first constant current switch and controls the LED light emitting unit 400 corresponding to a second operation section. In the second operation section, the second constant current switch controls the LED drive current ILED flowing through the LED light emitting unit 400 to a preset second LED drive current ILED2 through constant current control. When the drive voltage Vp supplied to the LED light emitting unit 400 is dropped to less than the second forward voltage level Vf2 from a maximum voltage level, the LED drive current ILED does not flow through the second LED group 420. Accordingly, the LED drive controller 500 according to the present exemplary embodiment detects the LED drive current ILED flowing through the second LED group 420 or the second constant current switch, and turns on the first constant current switch by determining that the LED light emitting unit 400 enters the first operation section, when the LED drive current ILED is not detected or the detected LED drive current ILED is less than or equal to a preset LED drive current.

As a result, the LED drive current ILED flows through the first current path P1, whereby the first constant current switch performs constant current control with respect to the LED drive current ILED. As described above, the LED drive controller 500 according to the exemplary embodiment may detect the LED drive current ILED flowing through the second LED group 420 or the second constant current switch, and may perform sequential control of the first LED group 410 and the second LED group 420 based on the detected LED drive current. The second constant current switch is kept in a turned-on state irrespective of the operation sections.

The first constant current switch and the second constant current switch according to the present exemplary embodiment may be implemented using a sensing resistor for detecting current, a differential amplifier for comparing a currently detected current value with a reference current value, or a switching device configured to control connection of a current path according to output from the differential amplifier and to control the LED drive current flowing through the current path to become constant current, when the path is connected thereto.

In a section in which the voltage level of the drive voltage Vp is greater than or equal to the first forward voltage level Vf1 and is less than the second forward voltage level Vf2 (that is, in the first stage operation section wherein only the LED drive current ILED flowing through the first LED group 410 is detected), the first current path P1 is connected to the first LED group 410 under control of the LED drive controller 500, whereby the first LED drive current ILED1 flows through the first current path P1. Then, the LED drive controller 500 detects the first LED drive current ILED1 and performs constant current control such that the first LED drive current ILED1 can be kept at a first reference current IREF1. As described above, in the LED lighting apparatus 1000 according to the present exemplary embodiment, in a section in which the voltage level of the rectified voltage Vrec is less than the first forward voltage level Vf1, since the drive voltage Vp of the first forward voltage level Vf1 is supplied from the power factor compensation unit 300, a non-light-emitting section may be substantially removed, thereby preventing a flickering phenomenon.

In a section in which the voltage level of the drive voltage Vp is greater than or equal to the second forward voltage level Vf2 (that is, in the second stage operation section wherein the LED drive current ILED flowing through the second LED group 420 is detected), the first current path P1 is opened and the second current path P2 is connected to the second LED group 420 under control of the LED drive controller 500, whereby the second LED drive current ILED2 flows through the second current path P2. The LED drive controller 500 detects the second LED drive current ILED2 and performs constant current control such that the second LED drive current ILED2 can be kept at a second reference current IREF2.

The LED drive controller 500 according to the present invention is configured to perform constant current control with respect to the LED drive current in each of the operation sections based on the number of LEDs operated to emit light in each of the operation sections, in control of the LED drive current in each of the operation sections as described above. For example, as described above, when the number of LEDs operated to emit light in the first stage operation section (that is, the number of LEDs constituting the first LED group 410) is about half the number of LEDs operated to emit light in the second stage operation section (that is, a total number of LEDs constituting the first LED group 410 and the second LED group 420), the LED drive controller 500 may perform constant current control such that the first LED drive current ILED1 becomes about two times the second LED drive current ILED2.

The LED drive current in each of the operation sections may not be completely numerically determined, and the LED drive controller 500 may set and controls the LED drive current such that the total number of LEDs operated to emit light in each of the operation zones is inversely proportional to the LED drive current in each of the operation zones. An actual LED drive current in each of the operation zones may set and controlled in consideration of purposes, characteristics and technical margin of the LED lighting apparatus, the number and series/parallel connection relationship of LEDs constituting each of the LED groups, physical characteristics of the LEDs constituting each of the LED groups, and the like.

Although the present exemplary embodiment has been described with reference to the two-stage sequential driving type LED lighting apparatus, the technical features thereof may also be applied to a three-stage sequential driving type LED lighting apparatus, a four-stage sequential driving type LED lighting apparatus, and the like. That is, increase of the number of operation sections to three stages, four stages, and the like may be achieved by modifying the LED drive controller 500 shown in FIG. 4, for example, by adding a switching device for controlling sequential driving and constant current control of a third LED group (not shown).

Improvement of flicker index of the LED lighting apparatus 1000 according to exemplary embodiments of the present invention.

FIG. 5 shows waveform diagrams depicting relationships between drive voltage of an LED lighting apparatus according to an exemplary embodiment of the present invention, LED drive current thereof and light output from each of LED groups thereof. Referring to FIG. 5, a method of controlling an LED drive current in an LED lighting apparatus 1000 according to the present exemplary embodiment will be described in detail.

As described above, the LED drive current is controlled such that the LED drive current (for example, the second LED drive current ILED2) supplied to the LED light emitting unit 400, in an operation section in which the number of LEDs operated to emit light is relatively large (for example, in the second stage operation section), is smaller than the LED drive current (for example, the first LED drive current ILED1) supplied to the LED light emitting unit 400 in an operation section in which the number of LEDs operated to emit light is relatively small (for example, in the first stage operation section). Thus, the LED light emitting unit 400 provides substantially uniform light output in each of the operation sections. A ratio of the first LED drive current ILED1 to the second LED drive current ILED2 may be determined based on the number of LEDs constituting the first LED group 410 and the number of LEDs constituting the second LED group 420. For example, the first LED group 410 may be composed of three LEDs connected to each other in series and the second LED group 420 may also be composed of three LEDs connected to each other in series. Assuming that all of the LEDs have the same physical properties, three LEDs are operated to emit light in the first stage operation section and six LEDs are operated to emit light in the second stage operation section. Since light output of each of the LEDs is proportional to the magnitude of the LED drive current, the second LED drive current ILED2 must be numerically 50% of the first LED drive current ILED1 in order to allow light output in the first operation section to become equal to light output in the second operation section.

This concept can be expanded to a three-stage sequential driving type AC LED lighting apparatus, a four-stage driving type AC LED lighting apparatus, and the like. For example, in an exemplary embodiment in which each of the first LED group 410, the second LED group 420 and a third LED group (not shown) is composed of three LEDs connected to each other in series, assuming that the first LED drive current ILED1 is 100%, the LED drive current may be set and controlled such that the second LED drive current ILED2 becomes about 50% of the first LED drive current ILED1 and a third LED drive current (not shown) becomes about 33% of the first LED drive current. Here, it should be noted that the numerals referred to herein are provided for description and illustration only (that is, description and illustration of an inverse proportional relationship between the number of LEDs operated to emit light in each of the operation zones and the LED drive current in each of the operation sections), and in actual design and application, the LED drive current can be controlled based on various factors such that the total number of LEDs operated to emit light and the LED drive current in each of the operation sections have substantially a predetermined inverse proportional relationship.

Figure 5A:
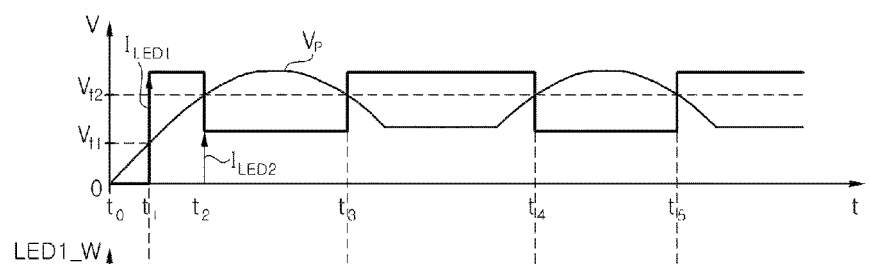
FIGS. 5(a), 5(b), and 5(c) show waveform diagrams depicting relationships between drive voltage of an LED lighting apparatus according to an exemplary embodiment of the present invention, LED drive current thereof and light output from each of LED groups thereof.
Figure 5B:
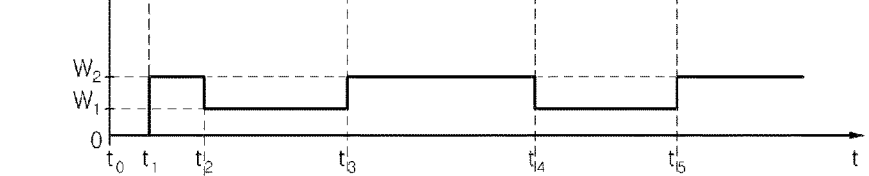
Figure 5C:
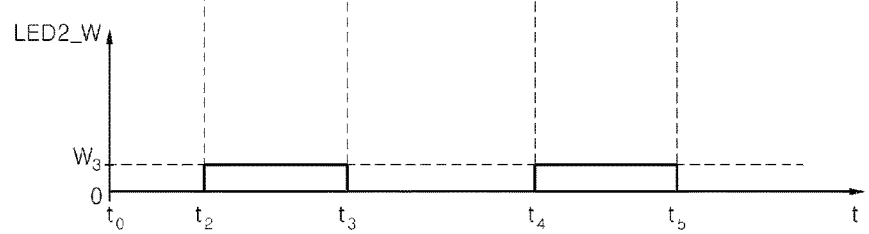

FIG. 5(a) is a waveform diagram depicting a relationship between the drive voltage Vp supplied to the LED light emitting unit 400 according to the present exemplary embodiment and the LED drive current ILED over time, FIG. 5(b) is a waveform diagram depicting light output (LED1_W) of the first LED group 410 over time, and FIG. 5(c) is a waveform diagram depicting light output (LED2_W) of the second LED group 420 over time in the LED light emitting unit 400 according to the present exemplary embodiment. As shown in FIG. 5(a), when the LED lighting apparatus 1000 is driven initially, the power factor compensation unit 300 is in a discharged stage, and there is no LED group emitting light until the drive voltage Vp reaches the first forward voltage level Vf1. Thereafter, when the drive voltage Vp reaches the first forward voltage level Vf1 (t1), the LED drive current ILED flows through the first LED group 410, whereby the first LED group 410 is turned on to emit light, and the LED drive current ILED flowing through the first current path P1 is controlled to a preset first LED drive current ILED1 through constant current control of the LED drive controller 500.

When the drive voltage Vp continues to increase and then reaches the second forward voltage level Vf2 (t2), the LED drive current ILED also starts to flow through the second LED group 420, whereby the second LED group 420 is turned on to emit light, and as the LED drive current ILED flowing through the second LED group 420 is stabilized after a transient state, the LED drive controller 500 determines that the LED light emitting unit enters the second operation section, and thus disconnects the first current path P1 (see FIG. 4) from the LED light emitting unit. The LED drive controller 500 controls the LED drive current ILED flowing through the second current path P2 to a preset second LED drive current ILED2 based on constant current control. Then, when the drive voltage Vp is dropped from the maximum value and again reaches the second forward voltage level Vf2 (t3), the LED drive current ILED does not flow through the second LED group 420, and thus the LED drive controller 500 determines that the LED light emitting unit again enters the first operation section, and reconnects the first current path P1 (see FIG. 4) to the LED light emitting unit.

The LED drive controller 500 controls the LED drive current ILED flowing through the first current path P1 to the preset first LED drive current ILED1 based on constant current control. As described above, since the LED lighting apparatus 1000 according to the present exemplary embodiment includes the power factor compensation unit 300 that can supply at least the drive voltage of the first LED group 410, that is, the drive voltage greater than or equal to the first forward voltage level Vf1, during the compensation section, the non-light-emitting section is removed. Then, the aforementioned procedure is repeated during operation of the LED lighting apparatus 1000.

Since the number of LEDs operated to emit light in the second stage operation section (t2~t3) is greater than the number of LEDs operated to emit light in the first stage operation section (t1~t2), the LED drive controller 500 according to the present exemplary embodiment controls the LED drive current such that the second LED drive current ILED2 becomes lower than the first LED drive current ILED1.

Accordingly, referring to FIG. 5(b), the first LED group 410 is kept in a luminous state (that is, in a turned-on state) in the overall sections excluding the initial charging section (t0~t1) during operation of the LED lighting apparatus 1000, and the light output (LED1_W) of the first LED group 410 is W2 in the first stage operation section (t1~t2, t3~t4, and the like) and is W1 in the second stage operation section (t2~t3, t4~t5). Since the second LED drive current ILED2 in the second stage operation section is smaller than the first LED drive current ILED1 in the first stage operation section, W1 is smaller than W2.

Referring to FIG. 5(c), the second LED group 420 is turned on to emit light only is in a section in which the voltage level of the drive voltage Vp is higher than the second forward voltage level Vf2 (that is, in the second stage operation section (t2~t3, t4~t5)), and the light output of the second LED group 420 is W3. The relationship between the first LED drive current ILED1 and the second LED drive current ILED2 is set and controlled such that the sum of the light output (W1) of the first LED group 410 and the light output (W3) of the second LED group 420 in the second stage operation section is substantially the same as or similar to the light output (W2) of the first LED group 410 in the first stage operation section. Accordingly, the LED lighting apparatus 1000 according to the present exemplary embodiment may provide uniform light output throughout the overall operation sections.

FIG. 6 shows waveform diagrams depicting relationships between drive voltage of an LED lighting apparatus according to an exemplary embodiment of the present invention, LED drive current thereof and light output from each of LED groups thereof. Referring to FIG. 6, a method of controlling an LED drive current in an LED lighting apparatus 1000 according to the present exemplary embodiment will be described in detail.

The exemplary embodiment shown in FIG. 5 and the present exemplary embodiment shown in FIG. 6 adopt the same technical features (that is, the technical features of setting and controlling the LED drive current in each of the operation sections to be inversely proportional to the number of LEDs operated to emit light in each of the operation sections). As compared with the exemplary embodiment shown in FIG. 5, in which the LED drive controller 500 is configured to immediately increase or decrease the LED drive current at a time point of switching control (that is, at a time point of changing the operation section), in the present exemplary embodiment shown in FIG. 6, the LED drive controller 500 linearly increases or decreases the LED drive current from a time point of switching control (that is, from a time point of changing the operation section) to a preset time.

Figure 6A:
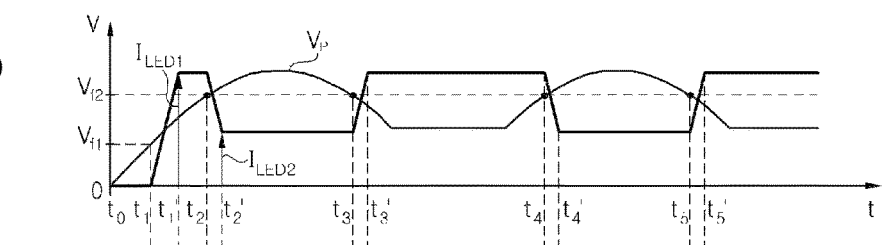
FIGS. 6(a), 6(b), and 6(c) show waveform diagrams depicting relationships between drive voltage of an LED lighting apparatus according to an exemplary embodiment of the present invention, LED drive current thereof and light output from each of LED groups thereof.
Figure 6B:
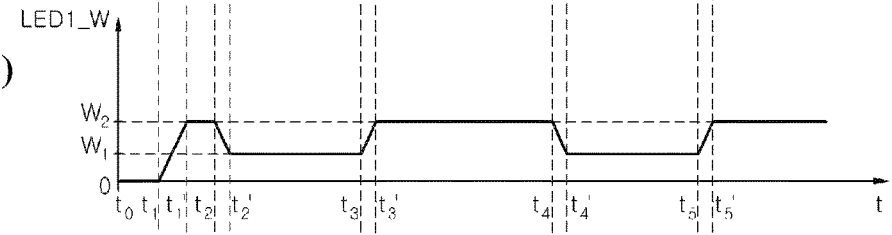
Figure 6C:
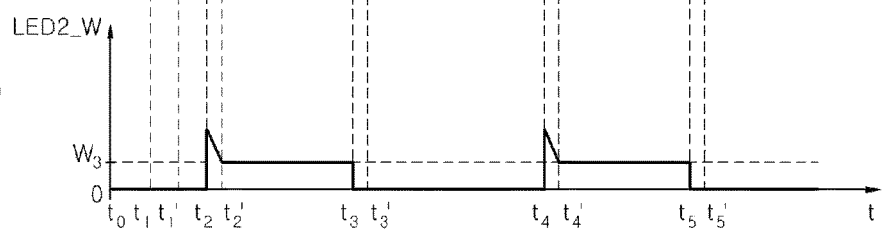

FIG. 6(a) is a waveform diagram depicting a relationship between the drive voltage Vp supplied to the LED light emitting unit 400 according to the present exemplary embodiment and the LED drive current ILED over time, FIG. 6(b) is a waveform diagram depicting light output (LED1_W) of the first LED group 410 over time, and FIG. 6(c) is a waveform diagram depicting light output (LED2_W) of the second LED group 420 over time in the LED light emitting unit 400.

As shown in FIG. 6(a), when the LED lighting apparatus 1000 is driven initially, the power factor compensation unit 300 is in a discharged stage, and there is no LED group emitting light until the drive voltage Vp reaches the first forward voltage level Vf1. Thereafter, when the drive voltage Vp reaches the first forward voltage level Vf1 (t1) and the LED drive current ILED starts to flow through the first LED group 410, the LED drive controller 500 linearly increases the LED drive current ILED flowing through the first current path P1 from 0 mA to a preset first LED drive current ILED1, and maintains the preset first LED drive current ILED1 as the LED drive current ILED during the remaining first stage operation section from a time point (t1') that the LED drive current ILED reaches the preset first LED drive current ILED1. Then, when the drive voltage Vp continues to increase and then reaches the second forward voltage level Vf2 (t2), the LED drive current ILED also starts to flow through the second LED group 420.

As the LED drive current ILED flowing through the second LED group 420 is stabilized, the LED drive controller 500 determines that the LED light emitting unit enters the second operation section, and disconnects the first current path P1 (see FIG. 4) from the LED light emitting unit. At this time, the LED drive controller 500 linearly decreases the LED drive current ILED flowing through the second current path P2 from the first LED drive current ILED1 to a preset second LED drive current ILED2, and maintains the preset second LED drive current ILED2 as the LED drive current ILED during the remaining second stage operation section from a time point (t2') that the LED drive current ILED reaches the preset second LED drive current ILED2. Then, when the drive voltage Vp is dropped from the maximum value to the second forward voltage level Vf2 (t3) and the LED drive current ILED does not flow through the second LED group 420 (or when the LED drive current ILED flowing through the second LED group 420 becomes a preset value or less), the LED drive controller 500 determines that the LED light emitting unit again enters the first operation section, and reconnects the first current path P1 (see FIG. 4) to the LED light emitting unit. At the same time, the LED drive controller 500 linearly increases the LED drive current ILED flowing through the first current path P1 from the second LED drive current ILED2 to the preset first LED drive current ILED1, and maintains the preset first LED drive current ILED21 as the LED drive current ILED during the remaining first stage operation section from a time point (t3') that the LED drive current ILED reaches the preset first LED drive current ILED1. Then, the aforementioned procedure may be repeated by the LED lighting apparatus 1000.

Although FIG. 6 shows the LED lighting apparatus according to the present exemplary embodiment in which the LED drive current is linearly increased or decreased for a predetermined time section, the LED lighting apparatus may alternatively be configured such that the LED drive current is increased stepwise to a preset value (for example, from the first LED drive current ILED1 to the second LED drive current ILED2 over stages), and is decreased stepwise (for example, from the second LED drive current ILED2 to the first LED drive current ILED1 over stages). The LED lighting apparatus may be configured such that the LED drive is current is instantaneously increased by a predetermined value (for example, by 50% of a difference between the first LED drive current ILED1 and the second LED drive current ILED2) and then further increased linearly or stepwise to a preset value (for example, to the first LED drive current ILED1), and is instantaneously decreased by a predetermined value (for example, by 50% of a difference between the first LED drive current ILED1 and the second LED drive current ILED2) and then further decreased linearly or stepwise to a preset value (for example, to the second LED drive current ILED2).

The structure of the LED lighting apparatus in which the LED drive current is controlled linearly or stepwise can prevent damage to the LEDs due to rapid increase or decrease of the LED drive current, and can reduce rapid light output deviation due to rapid increase or decrease of the LED drive current. That is, for example, in the first LED group 410, as the operation of the LED light emitting unit proceeds from the first stage operation section to the second stage operation section, the LED drive current is linearly decreased from the first LED drive current ILED1 to the second LED drive current ILED2, whereby the light output of the first LED group 410 is gradually decreased. In addition, as the operation of the LED light emitting unit proceeds from the second stage operation section to the first stage operation section, the LED drive current is linearly increased from the second LED drive current ILED2 to the first LED drive current ILED1, whereby the light output of the first LED group 410 is gradually increased. As a result, the LED lighting apparatus according to the present exemplary embodiment allows smooth change of multistage operation sections such that a user cannot perceive light output deviation of the first LED group 410 upon change of the multistage operation sections.

It will be apparent to those skilled in the art that various modifications and variation can be made in the inventive concept without departing from the spirit or scope of the inventive concept. Thus, it is intended that the inventive concept cover the modifications and variations of the present invention provided they come within the scope of the appended claims and their equivalents.

What is claimed is:

1. An LED lighting apparatus, comprising:
a light-emitting diode (LED) light-emitting device configured to emit light when driven by a voltage, the LED light-emitting device comprising a first LED group to an $n^{th}$ LED group, n being a positive integer of 2 or more;

a rectifier connected to an alternating current (AC) power source and configured to output a first rectified voltage as a first drive voltage to the LED light-emitting device through full-wave rectification of an AC voltage; and an LED drive controller configured to detect the first drive voltage applied to the LED light emitting device and configured to control sequential driving of the first LED group to the nth LED group, based on the detected first drive voltage, wherein the LED drive controller is configured to set an LED drive current in each of operation sections to be inversely proportional to a total number of LEDs operated to emit light in each of the operation sections such that a difference between light output of the LED light-emitting device in each of the operation sections does not exceed a predetermined light output deviation, and is configured to control the LED drive current to maintain a constant drive current in a corresponding operation section according to the set LED drive current in each of the operation sections.

2. The LED lighting apparatus according to claim 1, wherein the LED drive current is a first LED drive current to an $n^{th}$ LED drive current, the first LED drive current to the $n^{th}$ LED drive current being set to be sequentially decreased.

3. The LED lighting apparatus according to claim 1, wherein the LED drive current is a first LED drive current to an $n^{th}$ LED drive current.

4. The LED lighting apparatus according to claim 1, wherein the LED drive controller is further configured to linearly increase or decrease the LED drive current at a time point of starting a certain operation section from a previous LED drive current set in a previous operation section to a preset LED drive current set for the certain operation section, and control the LED drive current to be maintained at the increased or decreased LED drive current for the certain operation section during a remaining period of time of the certain operation section, the LED drive current being a first LED drive current to an $n^{th}$ LED drive current.

5. The LED lighting apparatus according to claim 1, wherein:
the LED light emitting device comprises a first LED group and a second LED group; and
a difference between light output of the first LED group during a first operation section and light output of the first LED group and the second LED group during a second operation section is less than or equal to a preset light output deviation.

6. The LED lighting apparatus according to claim 1, further comprising:
a power factor compensation circuit configured to be charged with energy using the rectified voltage in a charge section and supply a second drive voltage to the LED light emitting unit in a compensation section,
wherein:
the LED light emitting unit is configured to emit light when receiving the second drive voltage in the compensation section; and
the LED drive controller is further configured to detect the second drive voltage and control sequential driving of the first LED group to the $n^{th}$ LED group based on the detected second drive voltage.

7. The LED lighting apparatus according to claim 6, wherein the LED light emitting device comprises a first LED group and a second LED group, and the second drive voltage is greater than or equal to a forward voltage level of the first LED group.

8. The LED lighting apparatus according to claim 6, wherein the power factor compensation circuit comprises a valley-fill circuit and is configured to compensate for half of a total forward voltage level of the first to $n^{th}$ LED groups.

* * * * *